US010267223B2

United States Patent
Chen et al.

(10) Patent No.: US 10,267,223 B2
(45) Date of Patent: Apr. 23, 2019

(54) PORTABLE FOUR-STROKE ENGINE

(71) Applicant: CHONGQING RATO TECHNOLOGY CO., LTD., Chongqing (CN)

(72) Inventors: Ke Chen, Chongqing (CN); Heguangnan Zhi, Chongqing (CN); Jianguo Bai, Chongqing (CN); Tao Jiang, Chongqing (CN)

(73) Assignee: CHONGQING RATO TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 15/801,321

(22) Filed: Nov. 1, 2017

(65) Prior Publication Data
US 2018/0058313 A1    Mar. 1, 2018

(30) Foreign Application Priority Data
Nov. 4, 2016  (CN) .................... 2016 2 1193541 U

(51) Int. Cl.
*F02B 75/02*     (2006.01)
*F01L 1/18*      (2006.01)
(Continued)

(52) U.S. Cl.
CPC .............. *F02B 75/02* (2013.01); *F01L 1/024* (2013.01); *F01L 1/18* (2013.01); *F01L 1/181* (2013.01);
(Continued)

(58) Field of Classification Search
CPC ... F01L 1/024; F01L 1/18; F01L 1/181; F02B 75/02
See application file for complete search history.

(56) References Cited

U.S. PATENT DOCUMENTS

| 4,640,126 A | * | 2/1987 | Jansch | .................... G01F 23/04 116/227 |
| 5,022,495 A | * | 6/1991 | Lavender | ............... F01M 11/04 184/1.5 |

(Continued)

FOREIGN PATENT DOCUMENTS

JP        2001263035 A   *   9/2001

OTHER PUBLICATIONS

"2006 Honda Civic Powertrains." Wind Turbines Outperforming Expectations at Honda Transmission Plant—Honda.com, Aug. 31, 2005, news.honda.com/newsandviews/article.aspx?id=2005083041801.*

*Primary Examiner* — Kevin A Lathers
(74) *Attorney, Agent, or Firm* — Cheng-Ju Chiang

(57) ABSTRACT

The present utility model discloses a portable four-stroke engine, comprising: an engine body, a flywheel and an oil storage tank, wherein an air valve distribution chamber and a crank shaft chamber are arranged in the engine; a crank shaft is arranged in the crank shaft chamber, and is connected to the flywheel; the oil storage tank is arranged on the engine body, located above the flywheel, and configured to store lubricating oil; a cam and a rocker arm mechanism are arranged in the air valve distribution chamber; and the cam is configured to drive the rocker arm mechanism. The portable four-stroke engine provided by the present utility model has a small volume and therefore has better operation performance.

9 Claims, 12 Drawing Sheets

(51) Int. Cl.
*F01M 11/00* (2006.01)
*F01M 1/04* (2006.01)
*F01M 11/04* (2006.01)
*F01M 11/06* (2006.01)
*F01L 1/02* (2006.01)
*F16N 19/00* (2006.01)
*F02B 63/02* (2006.01)
*F01M 9/06* (2006.01)
*F01M 9/10* (2006.01)
*F02B 33/18* (2006.01)

(52) U.S. Cl.
CPC ............... *F01M 1/04* (2013.01); *F01M 11/00* (2013.01); *F01M 11/0408* (2013.01); *F01M 11/061* (2013.01); *F01M 11/065* (2013.01); *F16N 19/00* (2013.01); *F01M 9/06* (2013.01); *F01M 9/107* (2013.01); *F02B 33/18* (2013.01); *F02B 63/02* (2013.01); *F02B 2075/027* (2013.01)

(56) References Cited

U.S. PATENT DOCUMENTS 5,072,809 A * 12/1991 Shibata .................... F01M 1/12
123/196 R
2001/0029921 A1* 10/2001 Ito ........................... F01M 1/04
123/196 R

* cited by examiner

PORTABLE FOUR-STROKE ENGINE

TECHNICAL FIELD

The present utility model relates to the technical field of engines, and more particularly, to a portable four-stroke engine.

BACKGROUND

An ordinary hand-held engine and its oil storage tank are arranged in the engine structure, which increases a volume of the engine structure and is inconvenient to carry. This design also causes a large deviation between a hand-holding gravity center and a gravity center of a tool mounted on the engine. Thus, control and operations of the engine are inconvenient when using the engine.

SUMMARY

The technical problem to be solved by the present utility model is to provide a portable four-stroke engine with a small volume.

In order to solve the above problem, the present utility model provides a portable four-stroke engine, comprising: an engine body, a flywheel and an oil storage tank, wherein an air valve distribution chamber and a crank shaft chamber are arranged in the engine; a crank shaft is arranged in the crank shaft chamber, and is connected to the flywheel; the oil storage tank is arranged on the engine body, located above the flywheel, and configured to store lubricating oil; a cam and a rocker arm mechanism are arranged in the air valve distribution chamber; and the cam is configured to drive the rocker arm mechanism.

Further, the oil storage tank comprises a tank body and a tank cover; and the tank body is integrally formed with the engine body.

Further, an oil filling hole is formed in the tank cover; and a seal cover is arranged in the oil filling hole to seal the oil filling hole.

Further, an oil dipstick is arranged on the seal cover.

Further, the rocker arm mechanism comprises an air inlet rocker arm, an air outlet rocker arm and a rocker arm shaft; the rocker arm shaft is arranged on the engine body; both the air inlet rocker arm and the air outlet rocker arm are arranged on the rocker arm shaft; and the cam drives the air inlet rocker arm and the air outlet rocker arm.

Further, the air inlet rocker arm and the air outlet rocker arm cross each other to form an X shape.

In the portable four-stroke engine provided by the present utility model, the oil storage tank is provided outside the engine and above the flywheel. Thus, a gap between the flywheel and the engine is reasonably utilized, the volume of the whole engine is reduced, the engine can be better controlled when in use, and the operation convenience of the engine is improved. In addition, a single rocker arm shaft is used to reduce the width of the engine. The air inlet rocker arm and the air outlet rocker arm cross each other to form an X shape, so that when the rocker arms cooperate with the air valve pull rod, the rocker arms can be located more closely to the cylinder head, thereby reducing the height and the volume of the engine.

DETAILED DESCRIPTION

The present utility model is further described below with reference to the accompanying drawings.

Figure 1:
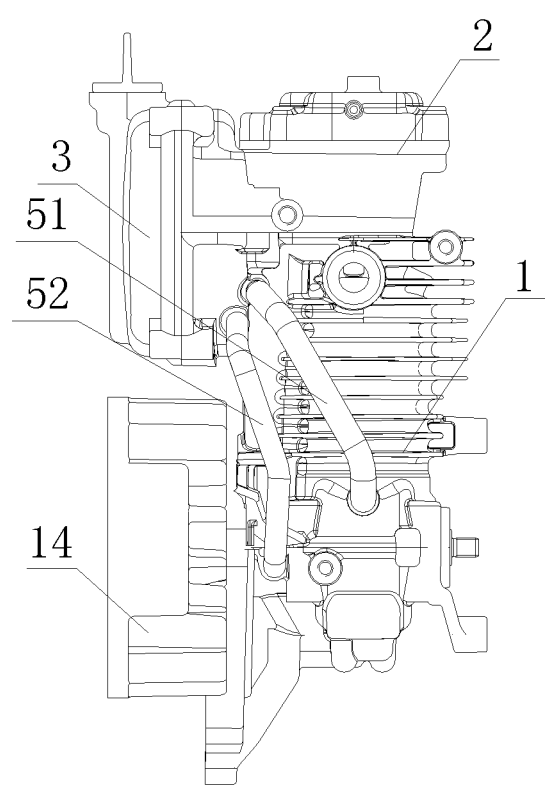
FIG. 1 is a schematically structural view of a four-stroke engine lubrication system according to a preferable embodiment of the present utility model.
Figure 2:
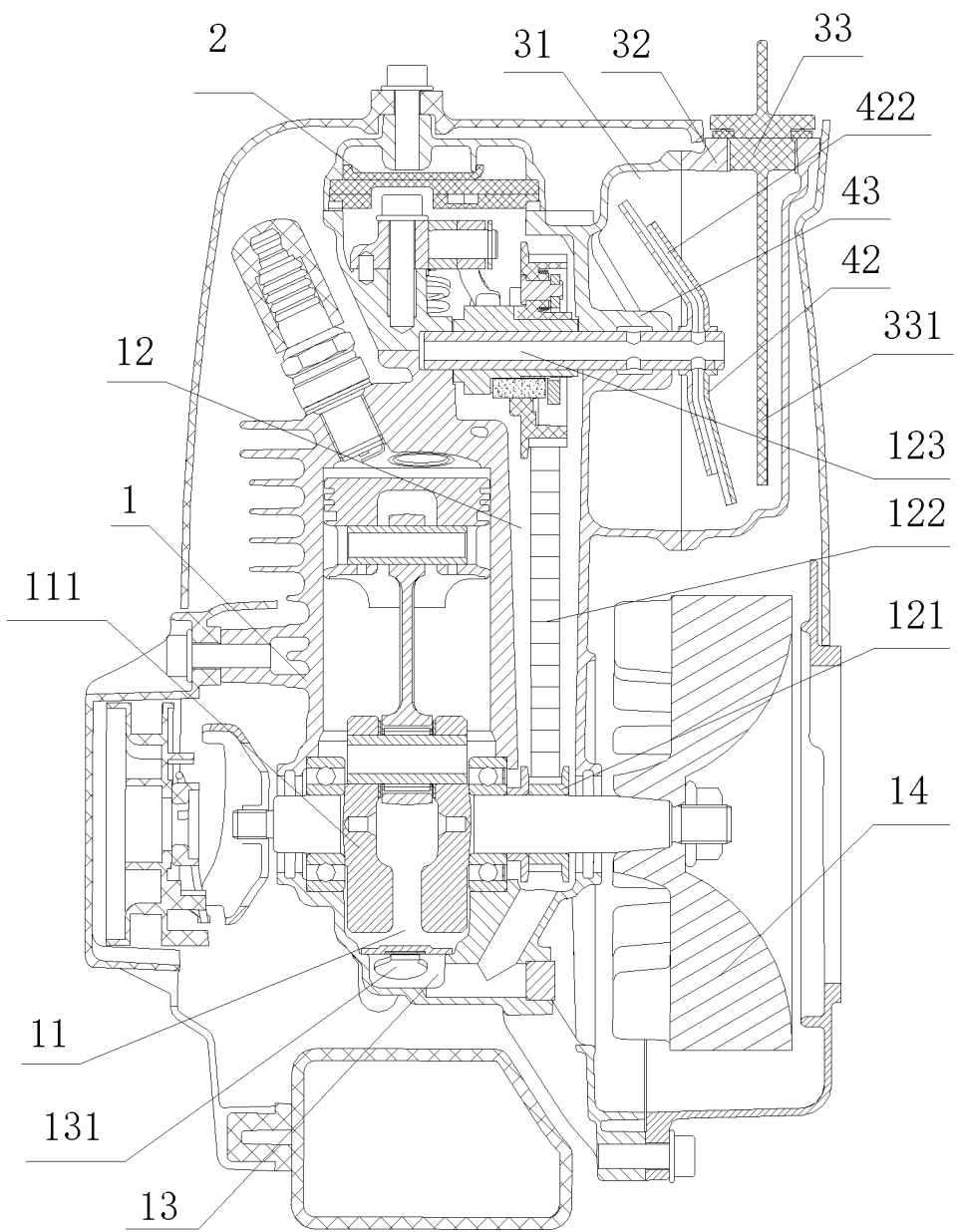
FIG. 2 is a sectional view of a four-stroke engine lubrication system provided by the present utility model.
Figure 3:
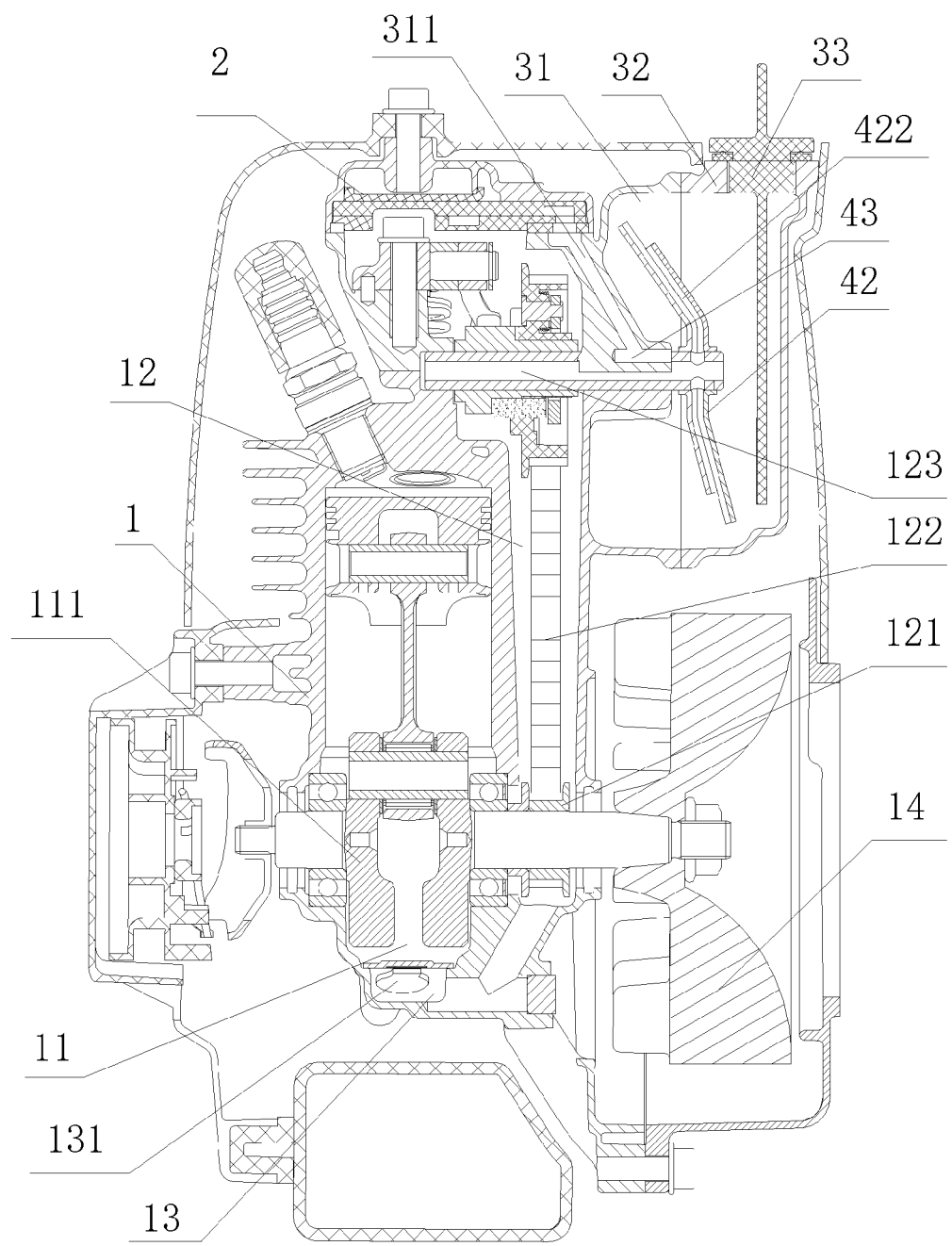
FIG. 3 is another sectional view of the four-stroke engine lubrication system provided by the present utility model.
Figure 4:
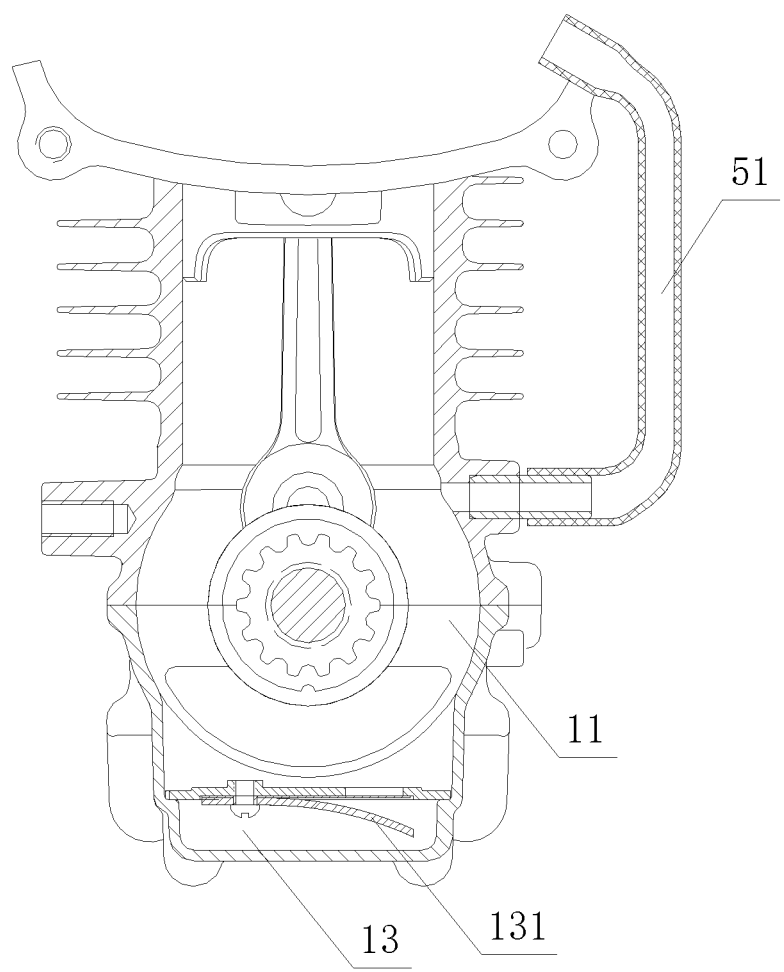
FIG. 4 is a schematically structural view of a connection structure of a crank shaft chamber and an oil storage tank.
Figure 5:
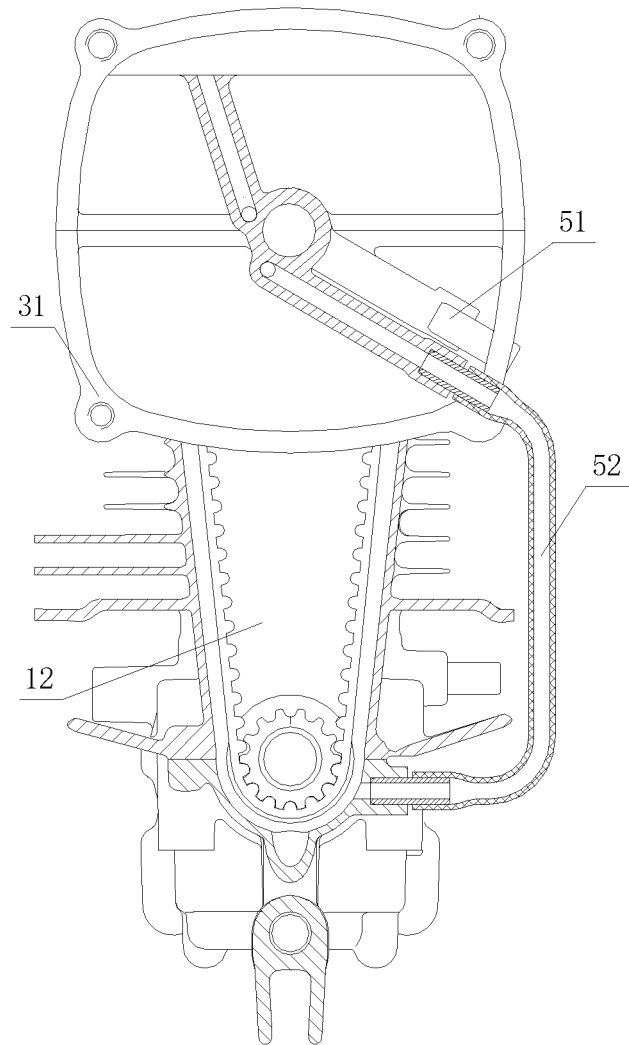
FIG. 5 is a schematically structural view of a connection structure of an air valve distribution chamber and the oil storage tank.

As shown in FIG. 1, a four-stroke engine lubrication system according to a preferable embodiment of the present utility model comprises an engine body 1 with an integrally formed cylinder head, a cylinder head cover 2 and an oil storage tank 3, wherein both the cylinder head cover 2 and the oil storage tank 3 are arranged at the upper end of the engine body 1, and the oil storage tank 3 is located outside the engine body 1.

Referring to FIGS. 2 to 5, a crank shaft chamber 11, an air valve distribution chamber 12 and a valve chamber 13 arranged below the crank shaft chamber 11 are arranged in the engine body 1. A check valve 131 is arranged in the valve chamber 13. The crank shaft chamber 11 is communicated with the air valve distribution chamber 12 via the valve chamber 13. The cylinder head cover 2 is arranged at the upper end of the engine body 1; and a flywheel 14 is arranged at the lower end thereof. The cylinder head cover 2 is communicated with the atmosphere. An air outlet hole 211 is formed in the cylinder head cover 2, and is communicated with the air valve distribution chamber 12 such that the upper end of the air valve distribution chamber 12 is communicated with the atmosphere. The oil storage tank 3 is located above the flywheel 14 such that a vacancy between the flywheel 14 and the engine is reasonably used. Thus, compared with the prior art that the oil storage tank 3 is arranged in the engine body, a space occupied by the whole engine is reduced, and the size of the engine body 1 is smaller. When the engine is used as a power source for a shearing machine or a chain saw, the gravity center of the whole machine may be closer to that of a person, so that use and control of the machine are more convenient.

A valve hole and a circulation flow passage are arranged in the valve chamber 13; the valve chamber 13 is communicated with the crank shaft chamber 11 via the valve hole; and the circulation flow passage of the valve chamber 13 is communicated with the air valve distribution chamber 12. The check valve 131, which is a diaphragm valve plate, is arranged in valve chamber 13 to open or close the valve hole. Pressures in the crank shaft chamber 11 are pulsating and alternate between a positive pressure and a negative pressure due to the ascending and descending movement of a piston. When the pressure in the crank shaft chamber 11 is increased, the valve plate opens the valve hole; and when the pressure in the crank shaft chamber 11 is reduced, the valve plate closes the valve hole. A crank shaft 111 is arranged in the crank shaft chamber 11, and is connected to the piston.

Figure 6:
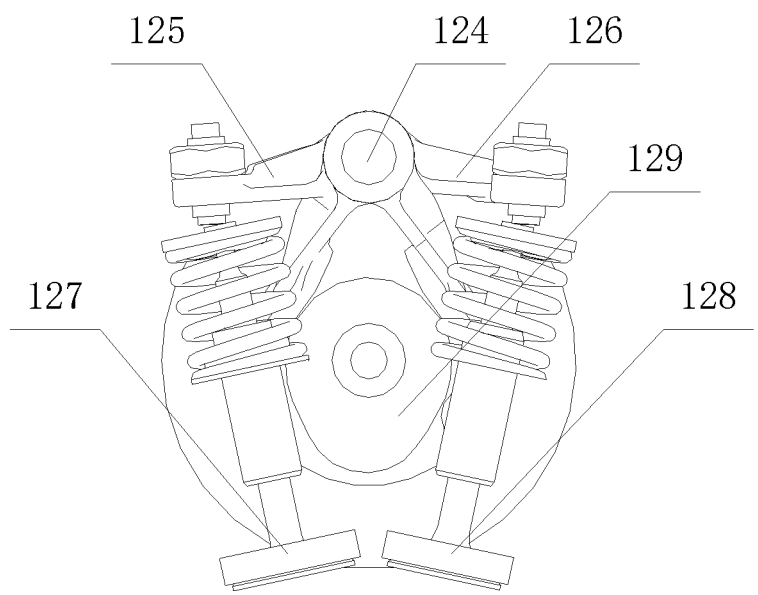
FIG. 6 is a schematically structural view of a rocker arm.
Figure 7:
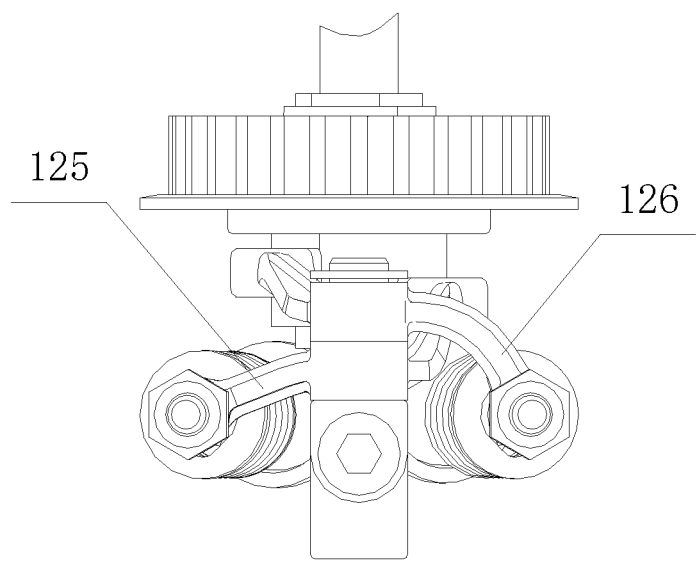
FIG. 7 is a top view of the rocker arm.
Figure 8:
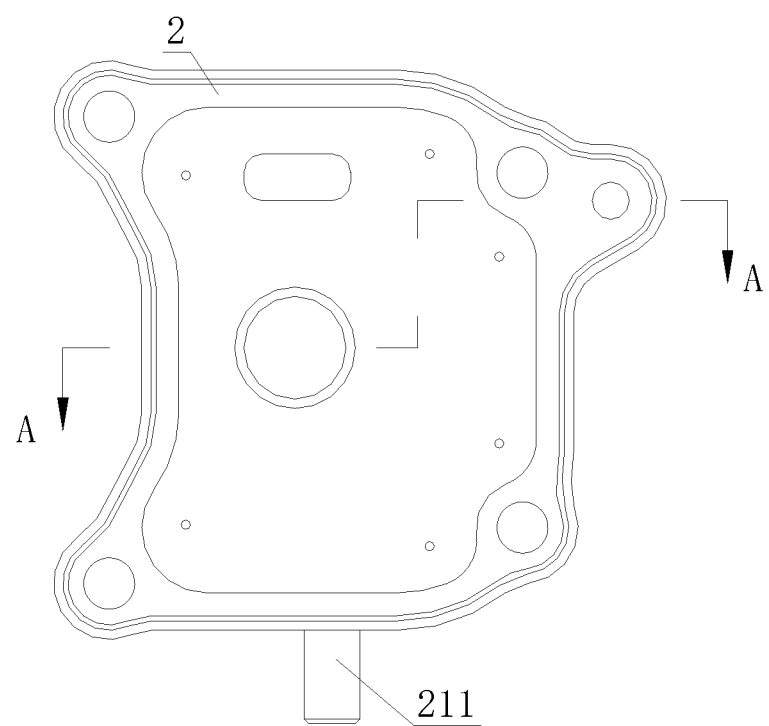
FIG. 8 is a schematically structural view of a cylinder head cover.
Figure 9:
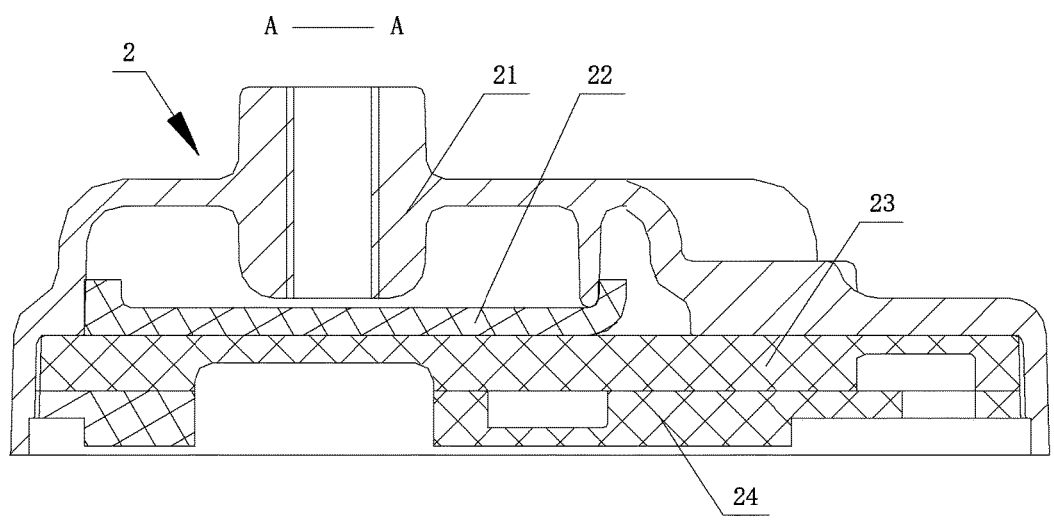
FIG. 9 is a sectional view of A-A in FIG. 8.
Figure 10:
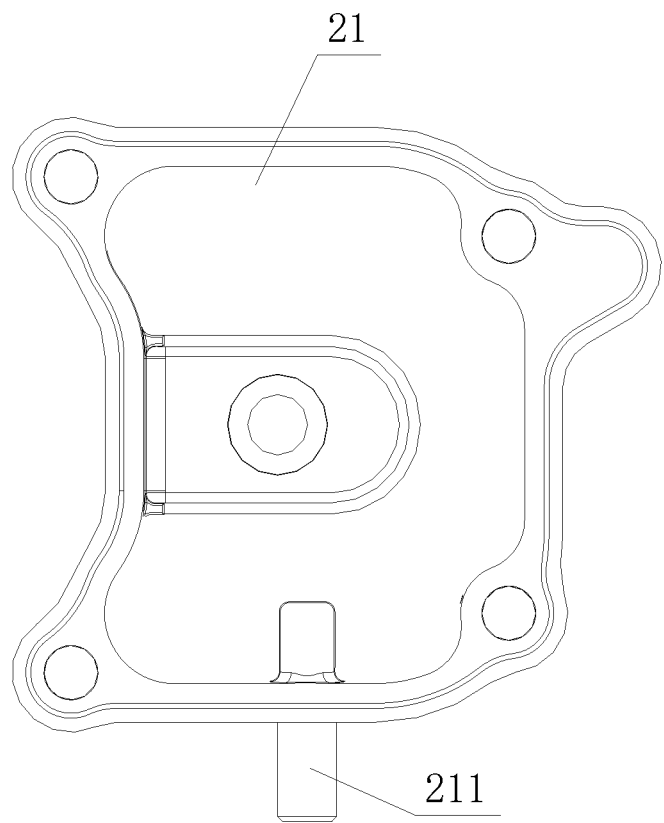
FIG. 10 is another schematically structural view of a cylinder head cover.
Figure 11:
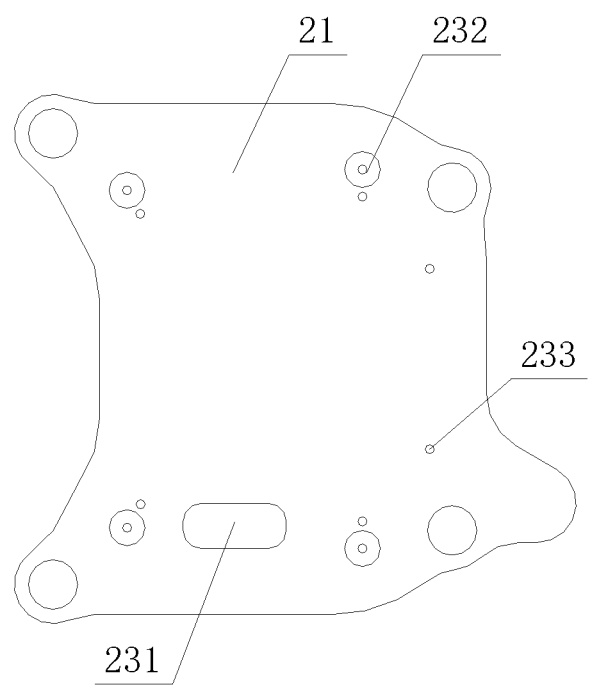
FIG. 11 is a schematically structural view of a breathing plate.
Figure 12:
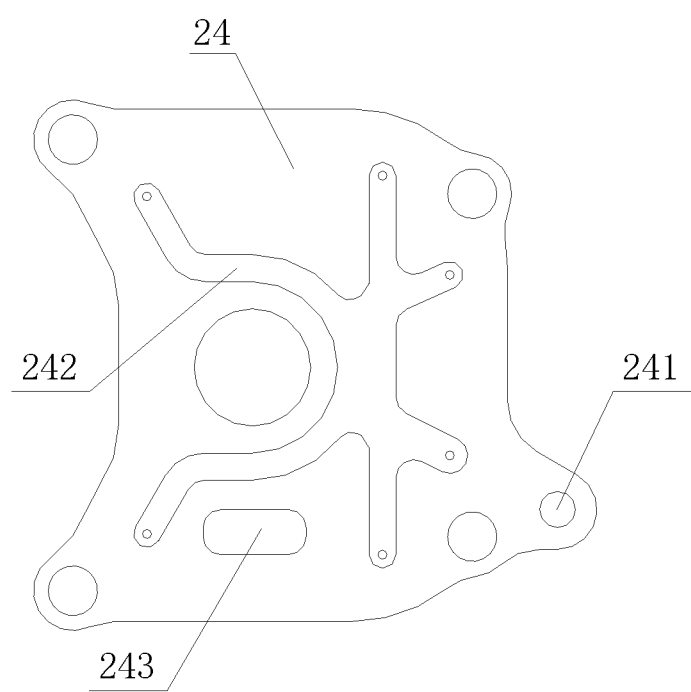
FIG. 12 is a schematically structural view of an oil return plate.

Referring to FIGS. 6 and 7, an air valve distribution mechanism is arranged in the air valve distribution chamber 12, and comprises a timing gear 121, a synchronous belt 122, a cam 129, a cam shaft 123, a rocker arm shaft 124, an air inlet rocker arm 125 and an air exhaust rocker arm 126; both the rocker arm shaft 124 and the cam shaft 123 are arranged on the engine body 1; both the air inlet rocker arm 125 and the air exhaust rocker arm 126 are arranged on the rocker arm shaft 124; when being viewed from the top, the air inlet rocker arm 125 and the air exhaust rocker arm 126 form an X shape; the cam 129 is arranged on the cam shaft 123, and drives the cam shaft 123 to rotate; and one end of the synchronous belt 122 is connected to the cam, and the other end thereof to the timing gear 121. The synchronous belt 122 brings lubricating oil mist in the air valve distribution chamber 12 into one end of the cam shaft 123 to lubricate parts at the upper end. The air inlet rocker arm 125 and the air exhaust rocker arm 126 are mounted on one shaft to directly reduce the width of the engine; meanwhile, a mounting position of the rocker arm shaft 124 may be lowered, and a compatibility between the rocker arm and the piston may still be kept, so that compared with an engine body 1 with two rocker shafts 124 in the prior art, the size of the engine body 1 is smaller. Moreover, an included angle between an air inlet valve 127 and an air exhaust valve 128 is reduced as there is only one rocker arm shaft 124, so that the entire space occupied by the whole rocker arm mechanism is reduced. The included angle between the air inlet valve 127 and the air exhaust valve 128 may approximate a right angle, so that an air inlet passage may be designed to be vertical approximately, thereby enabling inlet air to flow into a cylinder more smoothly. Therefore, the performance of the engine may be improved. Especially, when the engine runs at a high speed, air inlet is smooth, so that an air-fuel ratio of the engine is controlled in an appropriate range, and the engine can perform better.

The oil storage tank 3 comprises a tank body 31 and a tank cover 32 which are fixed by bolts to form an accommodating cavity. An oil filling hole is formed in each of the tank body 31 and the tank cover 32; a seal cover 33 is arranged in each oil filling hole through which the lubricating oil may be poured into the oil storage tank 3. An oil dipstick 331 is arranged on the seal cover 33 to facilitate measurement of the lubricating oil in the oil storage tank. A return passage 311 is arranged on the tank body 31; one end of the return passage 311 is communicated with the accommodating cavity, and the other end thereof is communicated with the cylinder head cover 2; and the tank body 31 and the engine body 1 are integrally formed, so that a manufacturing process is simplified. The oil storage tank 3 is configured to store the lubricating oil; an oil mist generation device is arranged in the oil storage tank 3, and is configured to stir the lubricating oil to generate oil mist. An oil outlet passage is arranged on the oil mist generation device, and communicates the oil storage tank with 3 the crank shaft chamber 11 via an oil outlet pipe 51. The air valve distribution chamber 12 is communicated with the oil storage tank 3 via an oil return pipe 52; and an oil return hole 241 is formed in the bottom of the cylinder head cover 2, and is communicated with the oil storage tank 3.

The oil mist generation device comprises a rotating shaft, oil stirring plates 42 and a reducing sleeve 43; the reducing sleeve 43 is arranged on the rotating shaft in a sleeving manner; the rotating shaft is rotatable relative to the reducing sleeve 43; and the oil stirring plate 42 is fixed to the rotating shaft. The rotating shaft is integrally formed with the cam shaft 123, so that the manufacturing process and mounting are facilitated. The rotating shaft and each oil stirring plate 42 are provided with oil outlet passages; each oil outlet passage on the oil stirring plate 42 is communicated with the that on the rotating shaft; and the oil outlet passage on the rotating shaft is connected to the oil outlet pipe 51 via the reducing sleeve 43. Particularly, each oil stirring plate 42 comprises two special-shaped blades, each of which is provided with an oil groove 422 and a mounting hole; the two special-shaped blades are fixed; the two oil grooves 422 are combined to form the oil outlet passage; and the rotating shaft is mounted in the mounting holes. An oil inlet hole and an oil outlet hole are formed in the rotating shaft, and are communicated with the oil outlet passage in the rotating shaft; and the oil inlet hole is located in a mounting hole. A collection cavity and an oil outlet cavity are formed in the reducing sleeve 43; the collection cavity and the oil outlet cavity are communicated; the oil outlet passage on the rotating shaft is communicated with the collection cavity, that is, the oil outlet hole in the rotating shaft is located in the collection cavity; and the oil outlet cavity is communicated with the crank shaft chamber 11 via the oil outlet pipe 51. The reducing sleeve 43 is integrally formed with the oil storage tank 3, that is, the reducing sleeve 43, the tank body 31 and the engine body 1 are integrally formed to facilitate the manufacturing process.

As shown in FIGS. 8 to 12, the cylinder head cover 2 comprises a cylinder cover body 21, a rubber pad 22, a breathing plate 23 and an oil return plate 24 which are stacked and fixed from top to bottom sequentially. An air outlet hole 211 communicated with the atmosphere is formed in the cylinder cover body 21; air inlet holes 231 and 243 are formed in the breathing plate 23 and the oil return plate 24, respectively; oil dripping holes 233 and oil dripping columns 232 are arranged at edges of four corners of the breathing plate 23; a penetrating hole is formed in each oil dripping column 232; an oil return groove 242 and an oil return hole 241 are formed in the oil return plate 24; and the oil return hole 241 is communicated with the oil return passage 311 of the oil storage tank 3. The cylinder cover body 21 and the breathing plate 23 form a precipitating cavity; and the breathing plate 23 and the oil return plate 24 form an oil return cavity. When the engine is horizontally placed and operates, oil gas enters the precipitating cavity via the oil inlet holes 231 and 243; and gas is discharged via the air outlet hole 211. Meanwhile, oil mist entering along with the gas flows to the oil return cavity via the oil dripping holes 233 in the breathing plate 23; the lubricating oil in the oil return cavity 242 is collected into the oil return groove 242 and enters the oil return passage 311 via the oil return hole 241; and then the lubricating oil flows back to the oil storage tank 3. When the engine is upside-down, the gas enters the cylinder head cover 2 via the air inlet holes 231 and 243 likewise, and then is discharged via the air outlet hole 211; and the lubricating oil is sucked into the oil return cavity via the oil dripping columns 232, and finally enters the oil storage tank 3. Similarly, no matter in which direction the engine is tilted, the lubricating oil will be sucked into the oil storage tank via the oil dripping holes 233 or the oil dripping columns 232. The rubber pad is U-shaped, and is configured to reduce a flow speed of the oil gas, so as to further prevent the lubricating oil from being discharged along with the gas.

The vertical movement of the piston in the crank shaft chamber 11 causes an upward negative pressure to be maximum, so that the pressure in the crank shaft chamber 11 is smaller than that in the oil storage tank 3. The valve chamber and the air valve distribution chamber 12 are connected to the atmosphere via the cylinder head cover 2, and the oil storage tank 3 is connected to the cylinder head cover 2 via the oil return passage and is indirectly communicated with the atmosphere via the cylinder head cover 2, so that a pressure in the oil storage tank 3 is smaller than that in the air valve distribution chamber 12.

A relationship between the pressures in all the chambers may be expressed as:

$Pc<Po<Pv<Pt.$

Here, Pc is a pressure in the crank shaft chamber 11, Po is a pressure in the oil storage tank 3, Pv is a pressure in the air valve distribution chamber 12, and Pt is a pressure in the cylinder head cover 2.

During the operation of the engine, the oil stirring plates 42 are rotated along with the cam shaft 123 to stir the lubricating oil at the bottom of the oil storage tank to generate oil mist. When the piston moves upwards, as Pc<Po, the lubricating oil sequentially passes through the oil stirring plates, the rotating shaft, the reducing sleeve 43 and the oil outlet pipe 51 and is sucked into the crank shaft chamber 11, so as to lubricate a link mechanism of the crank shaft 111 in the crank shaft chamber 11. Here, the check valve 131 is closed. When the piston moves downwards, the check valve 131 is opened, and the crank shaft chamber 11 and the valve chamber are communicated. Meanwhile, the check valve 131 improves the oil-gas separation performance. The lubricating oil enters the air valve distribution chamber 12; the synchronous belt 122 drives the lubricating oil to lubricate all parts; and a part of excess lubricating oil returns to the oil storage tank via the oil return pipe 52. Exhaust in the engine body 1 enters the cylinder head cover 2 via the air inlet hole; after oil-gas separation is completed in the cylinder head cover 2, gas enters an air filter for reuse; and the lubricating oil flows back to the oil storage tank 3 via the oil return hole 241 in the cylinder head cover 2 to complete the whole lubrication process. When the engine rolls over or turns over (as shown in FIGS. 13 to 15), the surface of the engine lubricating oil at the bottom is always lower than the location of the oil hole in the reducing sleeve 43; and meanwhile, one end of the oil outlet passage of the oil stirring plates 42 is always located at the location of the lubricating oil, and sucks atomized lubricating oil. The atomized lubricating oil sequentially passes through the oil outlet pipe 51, the crank shaft chamber 11, the valve chamber 13 and the air valve distribution chamber 12, and enters the cylinder head cover 2; and after the oil-gas separation in the cylinder head cover 2, the lubricating oil is sucked into the oil storage tank 3 via the oil dripping holes 233 or the oil dripping columns 232 at last.

The oil storage cylinder 3, the crank shaft chamber 11, the air valve distribution chamber 12 and the cylinder head cover 2 are sequentially communicated; the air valve distribution chamber 12 and the oil storage tank 3 are directly communicated with each other; the check valve 131 is arranged between the crank shaft chamber 11 and the valve distribution chamber 12; and the check valve is opened when the pressure in the crank shaft chamber 11 increases, and is closed when the pressure thereof decreases so as to effectively avoid return of lubricating oil. By use of the pressure pulse in the crank shaft chamber 11, the oil mist generated in the oil storage tank 3 is circulated along the oil storage tank 3, the crank shaft chamber 11, the air valve distribution chamber 12 and the oil storage tank 3 in turn. When the engine turns over freely, the lubricating oil thereof can flow from the oil mist generation device into all the chambers and cavities and flow back to the oil storage tank 3 to complete the entire loop. Moreover, compared with the splashing lubrication manner, the oil mist lubrication can lubricate the parts more thoroughly.

The foregoing is only embodiments of the present utility model, and do not intend to limit the patent scope thereof. Equivalent structures, which are obtained by using the description and the accompanying drawings of the present utility model and are directly or indirectly used in other related technical fields, should be embraced by the protective scope of the present utility model.

What is claimed is:

1. A portable four-stroke engine, comprising: an engine body, a flywheel, an oil storage tank, and a cylinder head cover, wherein an air valve distribution chamber, a crank shaft chamber, and a valve chamber are arranged in the engine, a check valve, a value hole, and a circulation flow passage are arranged in the valve chamber, the value chamber is communicated with the crank shaft chamber via the valve hole, the circulation flow passage of the valve chamber is communicated with the air valve distribution chamber; a crank shaft is arranged in the crank shaft chamber, and is connected to the flywheel; the oil storage tank is arranged on the engine body, located on a side of the flywheel which is closer to the cylinder head than to the side opposite that, and configured to store lubricating oil; a cam and a rocker arm mechanism are arranged in the air valve distribution chamber; and the cam is configured to drive the rocker arm mechanism; an oil mist generation device is arranged in the oil storage tank, the oil mist generation device comprises a rotating shaft, several oil stirring plates, and a reducing sleeve, the reducing sleeve is arranged on the rotating shaft in a sleeving manner, the rotating shaft is rotatable relative to the reducing sleeve, the oil stirring plates are fixed to the rotating shaft, the rotating shaft and each oil stirring plate are provided with oil outlet passages, each oil outlet passage on the oil stirring plate is communicated with the that on the rotating shaft, and the oil outlet passage on the rotating shaft is connected to the oil outlet pipe via the reducing sleeve, the oil outlet pipe is connected to the crank shaft chamber; the cylinder head cover is arranged at the upper end of the engine body, the cylinder head cover is communicated with atmosphere and the air valve distribution chamber, such that the air valve distribution chamber is communicated with the atmosphere.

2. The portable four-stroke engine of claim 1, wherein the oil storage tank comprises a tank body and a tank cover; and the tank body is integrally formed with the engine body.

3. The portable four-stroke engine of claim 2, wherein an oil filling hole is formed in the tank cover; and a seal cover is arranged in the oil filling hole to seal the oil filling hole.

4. The portable four-stroke engine of claim 3, wherein an oil dipstick is arranged on the seal cover.

5. The portable four-stroke engine of claim 1, wherein the rocker arm mechanism comprises an air inlet rocker arm, an air outlet rocker arm and a rocker arm shaft; the rocker arm shaft is arranged on the engine body; both the air inlet rocker arm and the air outlet rocker arm are arranged on the rocker arm shaft; and the cam drives the air inlet rocker arm and the air outlet rocker arm.

6. The portable four-stroke engine of claim 5, wherein the air inlet rocker arm and the air outlet rocker arm cross each other to form an X shape.

7. The portable four-stroke engine of claim 5, wherein the air valve distribution chamber further comprises a timing gear, a synchronous belt, and a cam shaft, the cam shaft is arranged on the engine body, the cam is arranged on the cam shaft, one end of the synchronous belt is connected to the cam, the other end of the synchronous belt is connected to the timing gear, the synchronous belt brings lubricating oil mist in the air valve distribution chamber into one end of the cam shaft.

8. The portable four-stroke engine of claim 5, wherein the cylinder head cover comprises a cylinder cover body, a rubber pad, a breathing plate, and an oil return plate which are stacked and fixed from top to bottom sequentially.

9. The portable four-stroke engine of claim 1, wherein each oil stirring plate comprises two special-shaped blades, each of which is provided with an oil groove and a mounting hole, the two special-shaped blades are fixed, the two oil grooves are combined to form the oil outlet passage, the rotating shaft is mounted in the mounting holes, an oil inlet hole and an oil outlet hole are formed in the rotating shaft, and are communicated with the oil outlet passage in the rotating shaft, the oil inlet hole is located in a mounting hole, a collection cavity and an oil outlet cavity are formed in the reducing sleeve, the collection cavity and the oil outlet cavity are communicated, the oil outlet passage on the rotating shaft is communicated with the collection cavity, the oil outlet cavity is communicated with the crank shaft chamber via the oil outlet pipe.

* * * * *